Oct. 1, 1957  E. A. VON SEGGERN ET AL  2,808,037
EXCESS AIR CYCLE INTERNAL COMBUSTION ENGINE
Filed Jan. 16, 1956  6 Sheets-Sheet 1

INVENTORS
ERNEST A. VON SEGGERN
HENRY E. VON SEGGERN
BY
ATTORNEY

INVENTORS
ERNEST A. VON SEGGERN
HENRY E. VON SEGGERN
BY
ATTORNEY

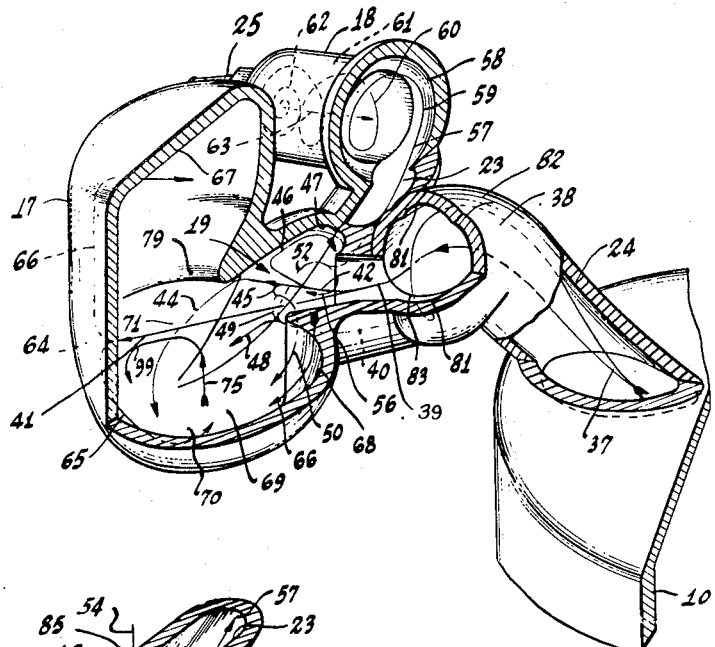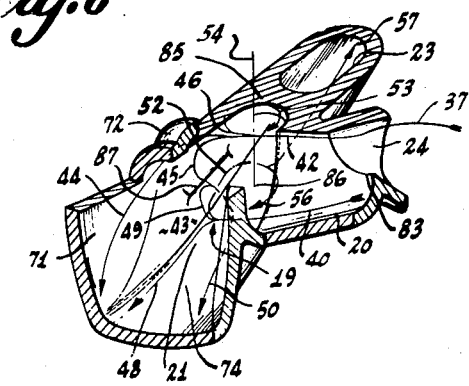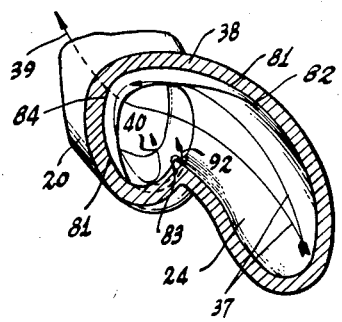

Oct. 1, 1957  E. A. VON SEGGERN ET AL  2,808,037
EXCESS AIR CYCLE INTERNAL COMBUSTION ENGINE
Filed Jan. 16, 1956  6 Sheets-Sheet 4
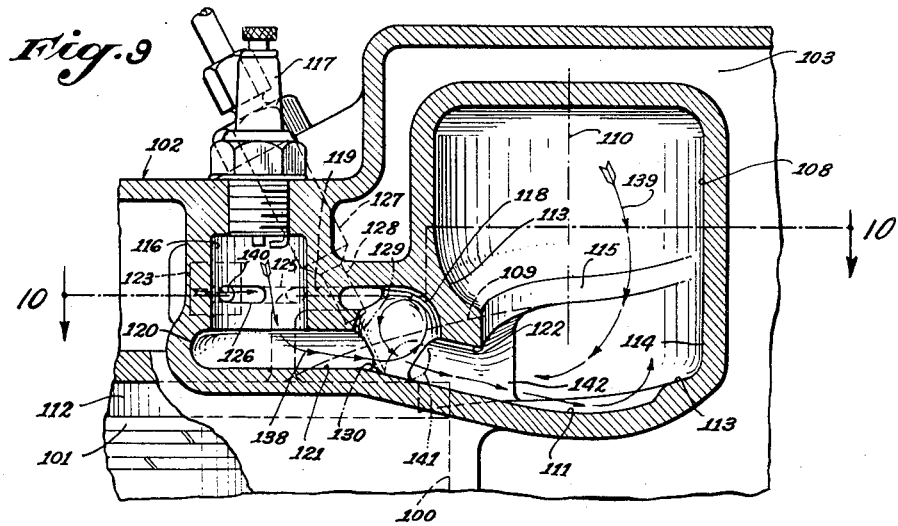
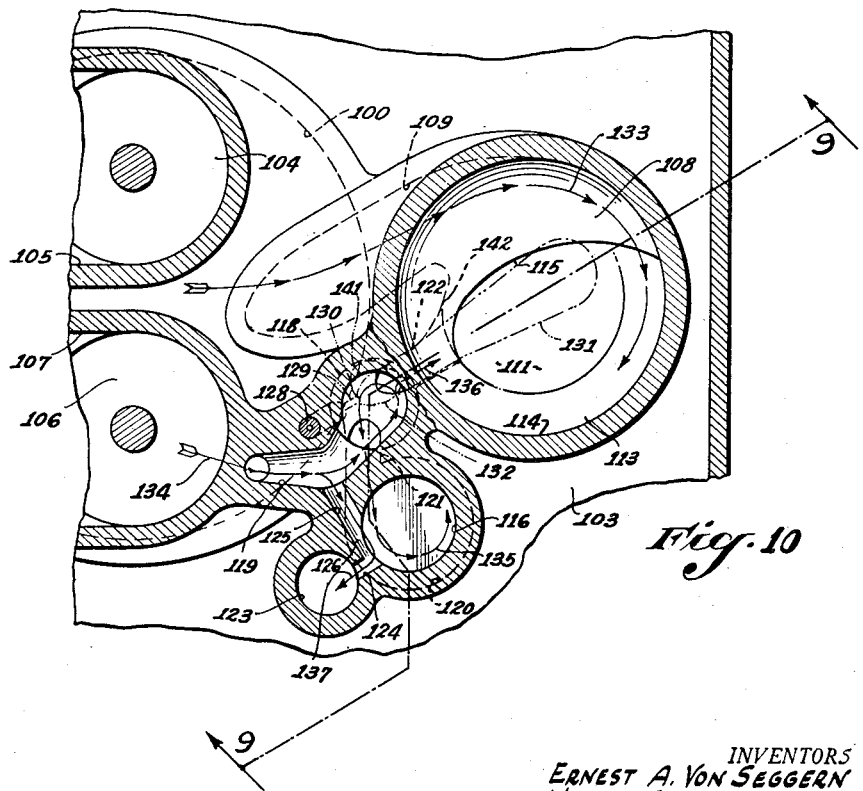
INVENTORS
ERNEST A. VON SEGGERN
HENRY E. VON SEGGERN
ATTORNEY

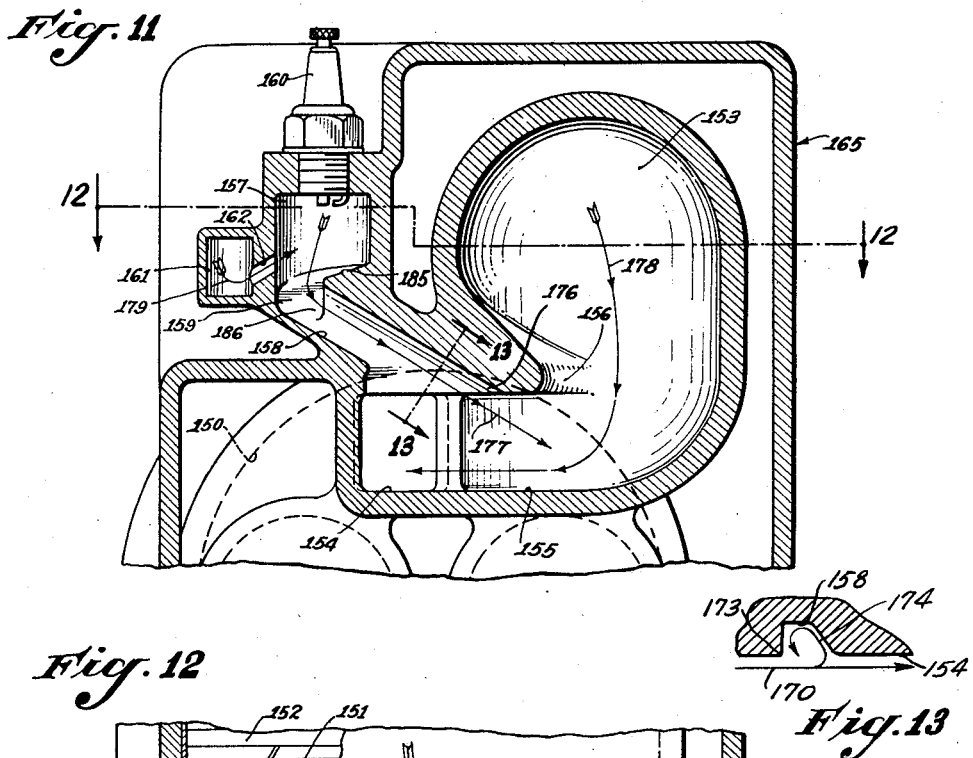
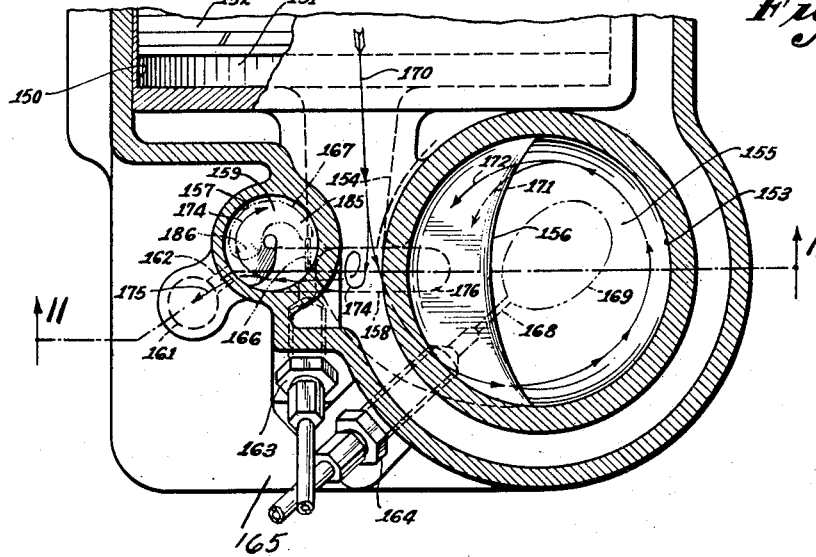

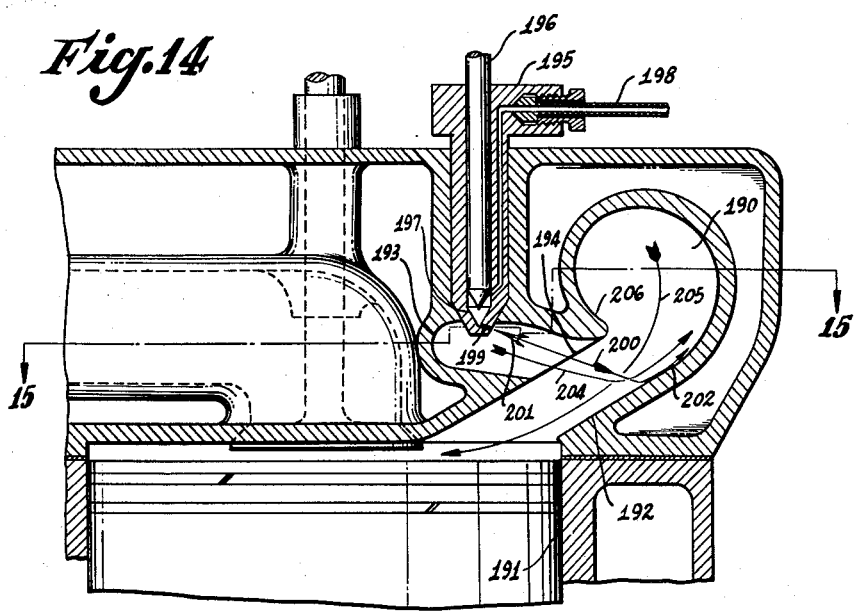
Fig. 14
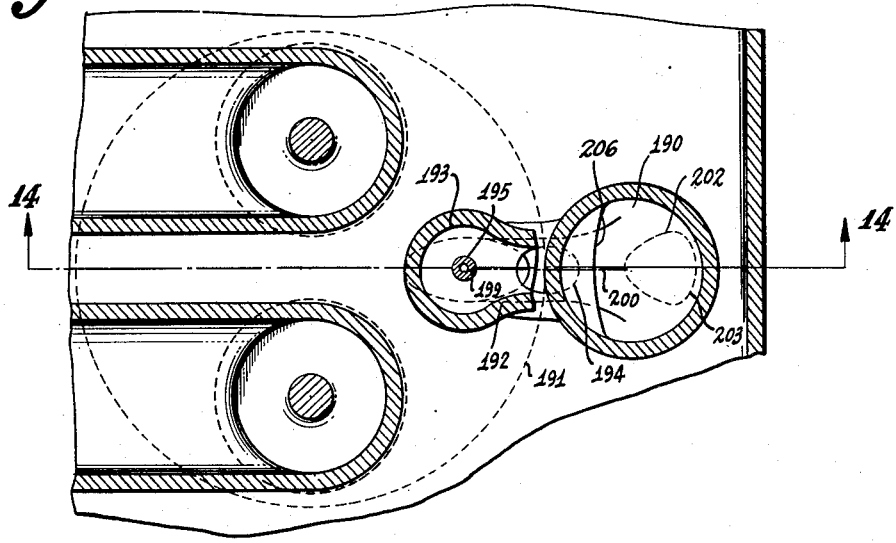
Fig. 15
INVENTORS
ERNEST A. VON SEGGERN
HENRY E. VON SEGGERN
ATTORNEY

United States Patent Office 2,808,037
Patented Oct. 1, 1957

2,808,037

EXCESS AIR CYCLE INTERNAL COMBUSTION ENGINE

Ernest A. von Seggern, Burbank, and Henry E. von Seggern, Escondido, Calif.

Application January 16, 1956, Serial No. 559,261

37 Claims. (Cl. 123—32)

This invention relates to combustion chambers for internal combustion engines, and in particular to chambers which are designed to operate with excess air in both high and low compression engines, and with either spark ignition or self ignition. Fuels such as gasoline, distillate, fuel oil, JP (jet propulsion) fuel, etc., are suitable for use in the combustion chambers and are burned at all compressions without detonation without regard to the octane or cetene number.

It is a general object of the invention to provide a combustion chamber of the type described in which fuel is burned which contains no additives of any type, and in which a combustion is obtained which is clean, fast, quiet and odorless. Another object is to provide a combustion chamber in which all types of fuel may be burned without forming gum or deposits or without diluting the lubricating oil with unburned fuel or sludge.

More specific objects include the provision of: a combustion chamber which operates with full excess air at part loads, particularly in low compression engines, to obtain the excellent part load thermal efficiency characteristic of high compression excess air cycle engines; a combustion chamber in which all types of fuel may be burned, and which receives its fuel from a low pressure, non-atomizing injection system whose timing relative to the engine cycle is non-critical; a combustion chamber in which all types of fuel may be ignited by a spark plug or a special low temperature low pressure self-ignition system; and a combustion chamber in which combustion is inherently stable and does not depend for its efficient operation upon critical adjustments, but is controlled principally by means of air flows which are produced by means of fixed structure which does not change with time.

Other general objects and features of the invention as well as special objects and features applicable to specific forms will be described in the specification in conjunction with the description of the specific forms shown therein.

The combustion chambers by means of which the foregoing objects are attained make use of a flame induced fuel vaporization method in which an ignition flame progressively vaporizes a charge of pre-heated liquid fuel, progressively forms a localized fuel-air mixture therefrom in the presence of excess air, and fires the fuel mixture as it is formed. The combustion chambers also make use of an ignition flame which is obtained from a localized charge of cool, vaporized fuel pre-mixed with air in stoichiometric proportions and surrounded by excess air, which joins in the reaction after the initial charge has been ignited and partially burned and the air has become heated.

Additional features of the combustion chambers will be described in conjunction with a description of the engine and its mode of operation. In the accompanying drawings showing typical illustrative embodiments of the broad invention:

Figure 5 is a dimetric projection, partially cut away, showing the cylinder head viewed from the cylinder side of the engine, and showing the air flows in the head during the compression cycle;

Figure 6 is a dimetric projection, partially cut away, showing the connecting zone with fuel vaporization means for producing fuel charges for the ignition chamber;

Figure 7 is a vertical section taken along the broken line 7—7 of Figure 4 showing flow dividing means at the junction of the connecting zone and the passage from the cylinder;

Figure 8 is a dimetric projection, partially cut away, showing the ignition chamber with an alternate type of air cell which may be applied to the engine;

Figure 9 is a vertical section of a second form of spark-ignition engine taken along the broken line 9—9 of Figure 10;

Figure 10 is a horizontal section taken along the broken line 10——10 of Figure 9;

Figure 11 is a vertical section of a low pressure self-ignition type engine taken along the broken line 11—11 of Figure 12;

Figure 12 is a horizontal section taken along the line 12—12 of Figure 11;

Figure 13 is a section taken along the broken line 13—13 of Figure 11 showing the gas flows in the ignition chamber charging passage;

Figure 14 is a vertical section of an engine which operates on the Otto cycle with throttled air supply, taken along the broken line 14—14 of Figure 15; and Figure 15 is a horizontal section of the engine taken along the broken line 15—15 of Figure 14.

Figure 1:
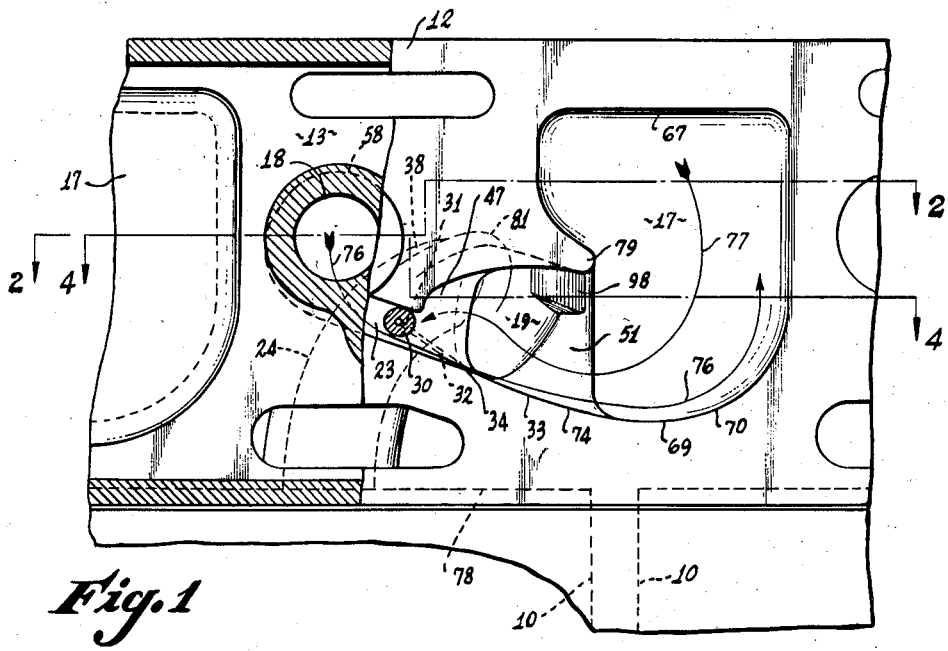
Figure 1 is a section of a preferred form of spark ignition engine taken along the broken line 1—1 of Figure 2 in vertical planes parallel to the crank shaft of a multiple cylinder-in-line engine.
Figure 2:
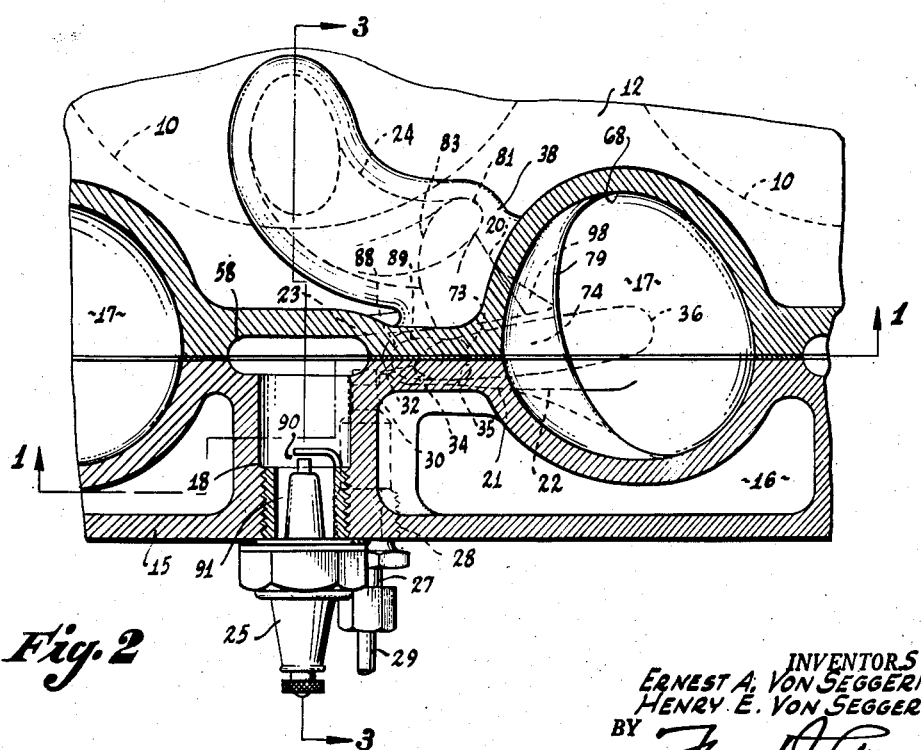
Figure 2 is a horizontal section taken along the broken line 2—2 of Figure 1.
Figure 3:
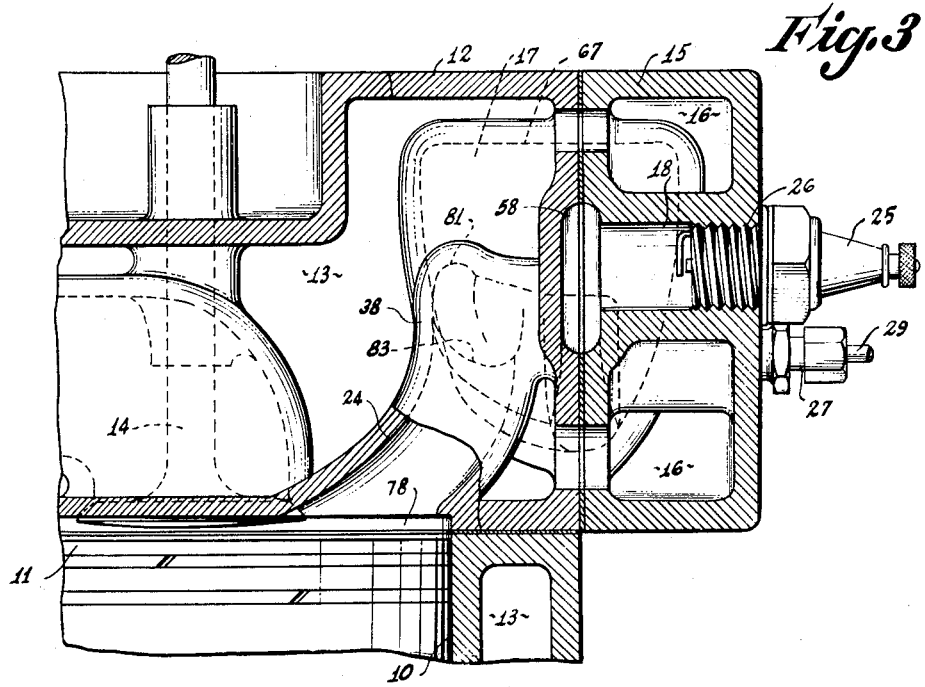
Figure 3 is a vertical section taken along the broken line 3—3 of Figure 2.
Figure 4:
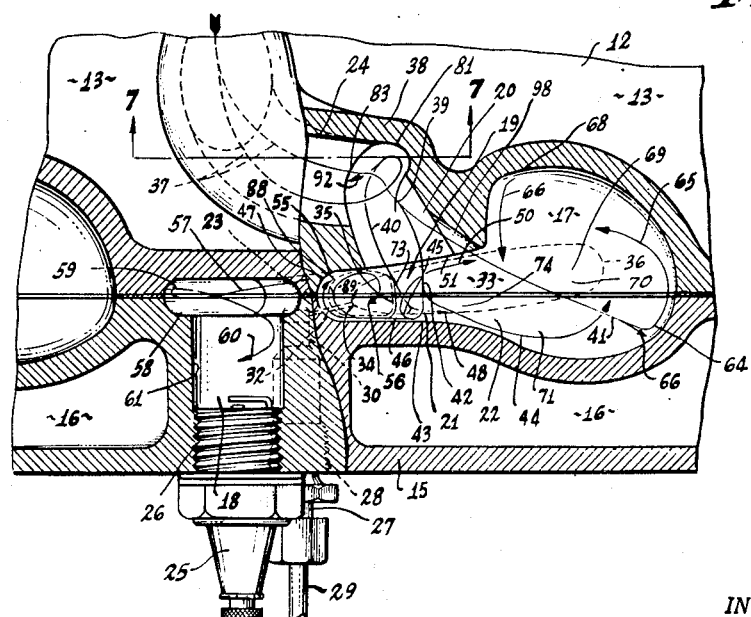
Figure 4 is a horizontal section taken along the broken line 4—4 of Figure 1 showing the passage from the cylinder, the connecting zone, the combustion chamber, and the ignition chamber.

The combustion chambers will be described as they operate when incorporated in four-cycle, water-cooled engines, but it will be evident that other cooling means can be used and that the chambers can also be applied to any type of engine employing a cyclic process of compression, combustion, and expansion, such as the two cycle engine and those types of engines which employ no mechanical piston at all but obtain compression and expansion by means of pressure waves in the working fluid. The chambers may also be incorporated in those types of burners which do not operate with intermittent combustion but maintain a steady flame in the combustion chamber, because incremental portions of the fuel and working fluid therein pass through the same sequence of steps as take place in a piston engine.

A preferred form of spark ignition of conventional four cycle, water cooled, valve-in-head design is shown in Figures 1 to 8, inclusive. A cylinder 10 with reciprocating piston 11 therein has a cylinder head 12 fastened onto its upper end and both cylinder and cylinder head are water cooled by means of a jacket 13. An inlet valve 14 and an exhaust valve (not shown) are located in head 12 above said cylinder, and are operated in the conventional manner by the usual mechanism (not shown). An auxiliary head 15, including a water jacket 16, is fastened to the side of head 12, and gives access, when removed, to combustion space separate from that enclosed by cylinder 10 and piston 11.

Formed within heads 12 and 15 are a combustion chamber 17, an ignition chamber 18, and a T shaped connecting zone 19 which includes a leg segment 20 and a cross-arm 21 normal thereto. One end of the cross-arm communicates with combustion chamber 17 through junctural passage 22 and forms a communicating zone between the connecting zone and the combustion chamber. The other end of the cross-arm communicates with ignition chamber 18 through passage 23, and this forms, with said junctural passage, a substantially straight, continuous passage from the ignition chamber to the combustion chamber. The leg segment 20 communicates with cylinder 10 through a curved passage 24.

A spark plug 25 is screwed into the threaded opening 26 of the ignition chamber 18 and a fuel injector 27, mounted horizontally in the auxiliary head 15, and substantially normal to passage 23, is clamped in place by means of a threaded nut 28. A conventional fuel injection pump (not shown) delivers fuel to said injector through a fuel line 29. Fuel nozzle 30 in the end of said injector projects into the passage 23 and has a single orifice through which the fuel is delivered in an unatomized stream 32 onto a fuel receiving surface 33. The injected fuel impinges obliquely on this fuel receiving surface and spreads out into an elongated fuel body extending from the point of impingement 34 toward the combustion chamber for a variable distance, proportional to the quantity of fuel injected. At no load idle operation the fuel body is indicated by the outline 35, while at full load it is indicated generally by the outline 36. The fuel is injected generally during the intake stroke, but injection may continue somewhat into the compression stroke. Since the engine operates at all times with a full unthrottled charge of air, the power output is controlled simply by varying the quantity of fuel injected.

During the compression cycle, air from cylinder 10 is displaced into passage 24 in a stream 37 as shown in Figures 4, 5, 6 and 7. At a tangential juncture of passage 24 with leg segment 20 (see Figs. 4, 5 and 7) stream 37 is divided by flow dividing means 38 described hereinafter, into an upper branch stream 39 and a lower branch stream 40, which charge the combustion chamber 17 and the ignition chamber 18, respectively. Upper branch stream 39 spreads out fan-wise in zone 19 (see Fig. 4) into a pair of streams 41 and 42, of which stream 41 passes directly into combustion chamber 17, while stream 42 impinges substantially normally against side wall 43. After impingement, stream 42 divides into a first stream 44 flowing into combustion chamber 17, a second stream 45 flowing downwardly (see Fig. 5) along wall 43, and a third stream 46 flowing horizontally along wall 43 into the cup shaped cavity 47 directly above the ignition chamber passage 23.

Simultaneously with the above, lower branch stream 40 flows into zone 19, impinges substantially normally against the bottom of side wall 43 (see Fig. 5), and divides into three streams 48, 49 and 52. Stream 48 flows toward the combustion chamber 17, while stream 49 flows upwardly, meets and joins stream 45, and combines therewith to form new stream 50. Stream 50 flows away from side wall 43 and crosses the connecting zone to the opposite wall 51 (see Figs. 1 and 4) where it is turned and flows toward the combustion chamber. The third stream 52 (Figs. 5 and 6) turns toward the ignition chamber passage 23, and upper stream 46, circulating in cavity 47, flows downwardly in a descending spiral 53 (Fig. 6) about a vertical axis 54, and meets stream 52. Stream 52 also circulates about axis 54 and impinges on side wall 55 (Fig. 4) directly below cavity 47, where it is divided. A branch stream 56 continues to circulate and the other branch stream 57 passes up the passage 23 into the ignition chamber.

In the ignition chamber, stream 57 circulates around the annular groove or channel 58 in a stream 59, and then passes in a spiral flow 60 up the side walls 61 (Fig. 5). At the spark plug 25 the air converges in a spiral stream 62, flows axially down the center of said chamber in a stream 63, and recirculates with the entering stream 57.

Stream 41, which flows directly into the combustion chamber 17, impinges substantially normally on a back wall thereof in a zone 64, and divides in a fan-like manner into two new streams. One stream flows generally downward in a spiral 65, and the other stream 66 flows directly upward to the top 67 of chamber 17. Here it turns and flows across the top and comes down again on the opposite sidewall 68 to join with stream 65 in a spiral flow converging toward the center 69 of the bottom wall 70 of chamber 17. Stream 44, which flows toward chamber 17 through junctural passage 22, is deflected downwardly along side wall 71 of chamber 17 by baffle 72 (Fig. 6) and also flows in a spiral toward the center of bottom wall 70. The three streams 44, 65 and 66 combine to produce a uniformly converging spiral flow.

The air stream 40, in flowing along the bottom of the connecting zone 19, cuts directly across the fuel body which has been injected onto fuel receiving surface 33, and separates the fuel along a line 73 which coincides with the end of the idle fuel charge remote from the point of fuel impingement. The quantity of fuel on the ignition chamber side of this dividing line is always substantially uniform, while the quantity of fuel on the combustion chamber side is variable. The fixed quantity of fuel is repeatedly swept over by the circulating stream 56, and the vapors produced are carried into the ignition chamber 18 by vapor carrier stream 57. The quantity of vaporized fuel added to the full air charge in the ignition chamber is fixed so as to produce a spark-ignitable fuel-air mixture having substantially stoichiometric proportions, and the size of the ignition chamber is made such that the power produced by this charge is sufficient by itself to idle the engine.

The variable quantity of fuel in chamber 17 is held in the liquid state during the entire compression cycle prior to ignition. The full load fuel charges deposited on bottom wall 70 are retained in the liquid state by means of the converging streams 44, 65 and 66 which flow at low velocity over the fuel and tend to concentrate it in the localized central area 69. The light load fuel charges extend essentially only onto the bottom wall area 74 of junctural passage 22 and the streams 48 and 50 which flow through this passage into the combustion chamber are sufficiently mild and diffused not to appreciably vaporize the fuel retained therein.

Shortly before top dead center, the prepared fuel-air mixture in ignition chamber 18 is ignited by spark plug 25, and the burning charge flows down passage 23, through connecting zone 19, and into chamber 17 in a flow 76, as shown in Fig. 1. The flaming gases bear forcefully against the retained liquid fuel charge on the fuel receiving and retaining surface 33 and vaporize and ignite a substantial portion thereof. The expanding gases from the resulting combustion in chamber 17 flow in a line 77 (Fig. 1) through the connecting zone 19 and passage 24 into clearance space 78 provided above the piston 11. Flow 77 is deflected against surface 33 by baffle 79 (Figs. 1, 2 and 5), and flaming gases sweep a second time over any fuel still retained thereon. The final combustion is obtained by means of excess air in the stream 77 and by air in the space 78.

The actual combustion process as carried out in the preferred embodiment of the invention is more complex than is indicated by the foregoing cycle of operation, and will be described in more detail in conjunction with a description of the air charging means, excess air supply means, and fuel charge preparation means which are located in the connecting zone 19, shown in section in Figure 6. The connecting zone is one of the most important elements in the combustion system, both because of the many functions that are performed therein, and because it is the common element onto which the ignition chamber, the combustion chamber and the engine cylinder are joined to form an operative structure.

The air charging means in said connecting zone supply the ignition chamber and combustion chamber with air during the compression cycle, and also maintain the ratio of residual exhaust gases to new air in each chamber equal to that ratio inherently fixed by the compression ratio of the engine. The desired air distribution is obtained by means of a series of four air pressure zones located between the combustion chamber and the ignition chamber that act as gas flow barriers, and prevent the flow of residual gases from one chamber to the other during the charging cycle. The pressure zones are formed by means of diffused air which is obtained in flow dividing means 38.

The means 38 consist of passage 24 in tangential juncture with the leg segment 20 of zone 19 and a circumferential groove 81 which begins at point 82 (Figs. 5 and 7) near the top of said means and extends downwardly in a twisted spiral to a point below passage 24 behind lip or edge 83, where it terminates by blending into leg segment 20. Stream 37 is directed by passage 24 to flow substantially normally onto the back wall 84 of groove 81 and the air in the groove is thereby diffused and forms stream 40. The capacity of groove 81 is so limited that stream 37 is divided into the stream 40, which fills the groove, and the stream 39, which passes through, inside the loop of the groove, and flows without diffusion directly into chamber 17.

The first pressure zone barrier is located directly in front of the ignition chamber charging passage 23, where diffused stream 40 cuts across the connecting zone and impinges on side wall 43. The body of diffused air which forms said barrier is maintained in front of the ignition chamber charging passage during the entire compression cycle up to the time of ignition, and the air for charging the ignition chamber is drawn from this source.

The second pressure zone barrier is located in the junctural passage 22 and is maintained there by means of diffused streams 48 and 50 which flow at a low velocity toward chamber 17 and purge the passage of residual gases.

The third pressure zone barrier is located between the first barrier and passage 23, and is formed by streams 53 and 56 which circulate directly in front of passage 23 about a vertical axis of rotation 54 which terminates against the top and bottom walls 85 and 86 of zone 19. The third barrier is designed to cut off any streams of residual gases which may penetrate the first and second barriers, particularly along the horizontal axes about which streams 40 and 50 tend to circulate. The important feature of the third barrier is that the axis of rotation of the circulating air therein is normal to the axes of rotation of the air in the first and second barriers and thereby any axial continuity through the system is cut off.

The fourth pressure zone barrier is located in passage 23, and is formed by the pressure induced displacement flow 57 which is the vapor-carrier stream that charges the ignition chamber. This diffused flow, contrary to a jetted, high velocity stream, completely fills the passage 23, and blocks the entry of residual gases.

The proper functioning of the pressure zone barriers is obtained largely through the design of side wall 43 of zone 19. Both the upper stream 42 and lower stream 40 impinge substantially normally on this wall where they are diffused and divided into three diverging streams each. In addition to this, a rib or cusp 87 (Figs. 6 and 8) is provided on wall 43 to fix the position where components 45 and 59 impinge on each other and combine to form stream 50. The cusp is also used to establish the direction of flow of said stream away from said wall.

The system of diffused air barriers in the connecting zone has additional uses besides preventing the flow of residual gases from the combustion chamber into the ignition chamber. During the compression cycle the circulating stream 56, which forms part of the third barrier, vaporizes the fuel for the ignition chamber, and it has sufficient energy to build up a concentrated mixture of cool vapors because it is driven by streams 40 and 46, which drive the vaporizing stream but do not themselves sweep over the fuel. The diffused vapor-carrier stream 57 does not have enough energy and velocity by itself to vaporize the fuel and form a cool vapor charge, and for this reason it is important to have a fuel vaporizer separate from the ignition chamber in a position where forces external to the ignition chamber can be applied to it.

The four air barriers also provide a continuous path of diffused air from the ignition chamber to the combustion chamber through which the ignition flame may easily pass in an undispersed stream when ignition occurs. The ignition flame must have an unrestricted path into the combustion chamber in order to effectively induce combustion therein and interception with the high velocity charging stream 41 is therefore carefully avoided.

It is a unique feature of the connecting zone, that within a single open passage, an air flow system is established which prevents circulation of residual gases, forcefully vaporizes a fuel charge for the ignition chamber, and provides a free path for the ignition flame to fire through into the combustion chamber.

The excess air supply means in the connecting zone deliver excess air to the ignition chamber during the charging cycle, and in order not to interfere with ignition, the air is localized in zones away from the spark plug points at the time of ignition. This air is provided to maintain the ignition chamber and spark plug in a clean condition at all times; to oxidize residual fuel on the fuel receiving surface for producing ignitable fuel vapors and for maintaining said surface in a stable condition; to promote ignition and combustion of the fuel in chamber 17; and to produce a clean and odorless combustion.

Three different methods for obtaining the excess air are provided, and they may be used either singly or in combination. In the first method, the excess air is obtained by means of a process which makes use of the difference in the rate of fuel vaporization at the beginning and end of the compression cycle. The vaporizing stream 56 is capable of vaporizing more fuel than is supplied to the fuel receiving surface 33, and therefore, being in limited supply, the bulk of the fuel is vaporized early in the vaporizing cycle. This results in the delivery of a more than stoichiometric mixture to the ignition chamber at the beginning of the charging cycle, followed by a "leaner" and "leaner" mixture toward the end.

As the fuel-air charge enters the ignition chamber it flows first around the annulus 58, then passes in a spiral flow 60 up the side walls 61, and finally flows in a converging spiral 62 toward the spark plug points 90. This carries the initially "rich" portion of the ignition charge up to the spark plug points where it is ignited, while the "leaner" after-portion fills the annular groove 58 and follows up the side walls 61. The "rich" portion becomes distributed along the length axis of chamber 18 in an axial stream 63, while the surrounding "leaner" zone extends up even into the annular space 91 of the spark plug, where the excess air promotes cleaning of the insulator.

When the spark plug ignites the central charge in the ignition chamber, combustion is initiated in a mixture of near stoichiometric proportions which burns rapidly. The charge is, however, surrounded by excess air, and after this air is heated by the central combustion it mixes with the burning gases and joins therewith to produce an exceptionally clean burning flame. The excess air is added to the flame at near peak pressures and temperatures when it is most effective, and when it does not interfere with ignition or the initial propagation of the flame.

The second method of supplying excess air to the ignition chamber is based on the fact that the combined flows of air stream 53 and vapor-carrier stream 57 charge the ignition chamber, and by increasing the strength of air stream 53 relative to vapor-carrier stream 57 during the compression cycle, the ignition chamber is supplied with a relative excess of air toward the end of its charging period.

The relative strength of streams 53 and 57 change during the compression cycle because they originate in streams 39 and 40 respectively, which latter have their relative strength changed in passing through flow dividing means 38. Stream 39 flows substantially without restriction through said means while stream 40 has its flow restricted and limited therein, particularly at high velocities. The loss of flow is caused by frictional resistance in groove 81 and by branching into a separate stream 92 formed by aspiration at the lip or edge 83. Assuming streams 39 and 40 to be of equal strength at the beginning of the compression stroke when velocities are low, it is evident that stream 40 will become somewhat weaker relative to stream 39 as velocities increase, and the respective branch streams 57 and 53 will also change in a corresponding manner.

The stream 92, which is formed by aspiration at the edge 83 and becomes diffused thereby, flows between streams 39 and 40 toward and into the connecting zone. It fills the space in leg segment 20 not filled by streams 39 and 40, and prevents the entry of residual gases from chamber 17 into this portion of the zone. It also assists stream 40 in supplying diffused air to the connecting zone and, to some extent, in charging the ignition chamber.

The third method of supplying excess air to the ignition chamber utilizes an auxiliary air supply, as shown in Figure 8. In this design an auxiliary annular groove 93, which forms an air receiving space, is provided adjacent the spark plug 25 and air is stored therein during the compression cycle. The air is supplied through passage 94 which joins groove 93 tangentially at a point 95 and joins the connecting zone 19 at the point 96 where stream 42 impinges normally on side wall 43. During the compression cycle a portion of stream 42 flows through passage 94 in a stream 97 which enters annular groove 93 and circulates therein as shown. At the same time the fuel-air mixture normally supplied to the ignition chamber circulates in a stream 60 in the same direction of rotation as stream 97, and because of the parallel flow the fuel mixture does not appreciably intermix with the air in groove 93 during the charging cycle. After the mixture is ignited by plug 25 this additional excess air is present to mix with the burning gases and join in the combustion.

It is possible to vary the fuel-air ratio in the ignition chamber quite widely during the operation when it is provided with a localized fuel mixture and excess air by the methods described because the great cleaning action exerted on the spark plug and ignition chamber walls by the excess air immediately cleans up any deposits which may momentarily be formed by an over-rich mixture.

The fuel charge preparation means are located in the connecting zone, and are designed to produce the fuel charge for the ignition chamber. The quantity of fuel supplied to said means is always substantially fixed for all engine speeds and loads, but a manual adjustment is also provided in order that the fuel-air ratio of the charge may be changed somewhat to obtain the optimum performance.

The adjustment is made by rotating the injector 27 axially in its socket and locking in any desired position by means of lock nut 28. The nozzle orifice 31 is drilled substantially perpendicular to the axis of rotation of the injector, and consequently the point of impingement 34 of fuel stream 32 can be readily moved nearer to or further away from the ignition chamber 18 by rotating the injector. Since the ignition chamber charging stream 40 cuts along a fixed line 73 directly across the elongated fuel body formed by fuel stream 32 after impingement, the quantity of fuel on the ignition chamber side of said line of division is varied simply by changing the point of fuel impingement relative to said line. Rotating the injector clockwise when viewed from the outside of the engine as in Figure 1 increases the quantity of fuel in the ignition chamber charge, and vice versa.

The liquid fuel that is deposited by the injector for producing the ignition chamber charge is vaporized in two different ways, and forms two distinct types of vapors. The first type is produced by a simple, cool vaporization, induced by passing the circulating stream 56 repeatedly over the liquid fuel body during the compression cycle, while the second type of fuel vapor is produced by a flame induced vaporization process which acts on fuel that has been carried over from the previous cycle.

The second type of vapor is produced in the following manner. The liquid fuel charge that has been initially deposited on the fuel receiving surface 33 during the intake cycle by injector 27, is moved, during the compression cycle, by charging stream 52 into a new location in the vapor collection zone 89, as shown by outline 88. During this displacement some of the fuel is vaporized into the first type of vapor by streams 52 and 56 and is delivered to the ignition chamber while the remainder is retained in the liquid state in zone 89.

After ignition the ignition flame passes in a stream 76 over the retained fuel and heats the fuel, and a portion thereof is burned by means of excess air contained in the flame. The flame from the fuel charge in the combustion chamber also passes, in a stream 77, at least partially over the remaining fuel to further heat and burn the fuel. The burning by both flames removes excess fuel from the fuel receiving surface and maintains the surface in a stable condition at all times by burning off any carbon that becomes more than a few mils thick. The flame cannot, however, completely remove all carbon from the cooled surface, and a thin layer of soft carbon remains in which a small quantity of fuel is retained. The retained fuel is not completely burned by the passing flame because of the low temperature at which it is held by the engine cooling system, but it is nevertheless partially oxidized thereby and is carried over to the following cycle for subsequent vaporization.

In order not to cover and quench the partially oxidized fuel, the fuel charge for the following cycle is injected and deposited, as shown by outline 35, in a zone separate from outline 88, and the fuel vapors from the retained fuel within outline 88 rise and collect in vapor collection zone 89 during the intake and compression cycle. The vapors from the retained fuel are held in the collection zone by the diffused air forming the first and second pressure zone barriers and are displaced into the ignition chamber by stream 57 during the time the newly injected fuel is being displaced from its initial position 35 to its final position 88.

It is a feature of the fuel preparation means that, in preparing the two types of vapor, the accidental formation of atomized fuel is effectively minimized. During vaporization of the fuel, the circulating stream 56 centrifuges any fuel droplets formed onto the side walls of the collection zone 89 for revaporization, and a similar centrifuging action is also obtained in the annular passage 58 in the ignition chamber.

An additional feature is that delayed vaporization of fuel from the vaporizing surface in the engine is eliminated. During the power cycle the vaporization of fuel from the fuel receiving surface is momentarily terminated by burning off all the exposed fuel on the surface with the excess air in the combustion flame, and this makes the vaporization process intermittent. This is an essential function in a combustion system that is to operate with a clean and odorless exhaust.

The type of vapor that is obtained from fuel which has been burned over while held on a cool surface is much more ignitable than the first type of vapor produced, and when properly concentrated, makes any fuel spark-ignitable and even makes low cetene number fuels self-ignitable at low compression ratios. Fuel which is normally self-ignitable only at high diesel pressures is, when prepared according to the process described, not only spark ignitable but is self-ignitable in the spark ignition range of compression ratios such as 10:1 to 5:1 or even lower. Operation with self-ignition is equivalent to that with spark ignition except that no spark is required. The spark plug insulator acts to initiate ignition and, because of the excess air which is provided, remains perfectly clean at all times.

There is no detonation or knocking of any kind in the ignition chamber, either with spark ignition or self-ignition. This is insured by having the fuel charge composed entirely of cool fuel vapors and by burning it in a small, cool and clean chamber entirely free of deposits. It is an important feature that the fuel charge contains no liquid atomized fuel, because atomized fuel can cause fouling of the spark plug and detonation and also the formation of deposits which lead to pre-ignition. The formation of heated fuel vapors in the fuel charge is also avoided, because high temperatures decompose the fuel into products which are difficult to ignite and are slow burning.

The cool fuel vapors of the second type are produced by a vaporization process which depends almost entirely on heat from an intermittent flame applied to the surface of the fuel, and not from residual heat in the fuel receiving surface. Consequently the production of this type of vapor is almost entirely independent of engine temperature, and the engine is designed to operate to a very large extent on this type during the warm-up period. As the cooling water on the opposite side of the wall that forms the fuel receiving surface reaches the usual operating temperature range of 160 to 180 degrees Fahrenheit and the fuel receiving surface reaches its normal temperature, a larger proportion of the fuel charge is vaporized during the compression cycle to form the first type of cool vapor, and proportionately less of the fuel is carried over for the production of the second type of vapor. The result is that the engine operates uniformly at all temperatures on a combination of both types of vapor, and does so even with fuels having widely different volatility.

It is a feature of the fuel charge preparation means that the fuel receiving surface exerts a positive control on the temperature of the liquid fuel deposited thereon. It acts initially as a heat source to heat the newly injected fuel to promote preflame reactions and vaporization by vaporizing stream 56, and it also acts as a heat sink to cool the retained fuel during the period when it is subjected to the heat of the ignition and combustion chamber flames. This dual action insures the production of uniformly cool fuel vapors of both types regardless of engine speed or load.

The function of the fuel receiving surface 33 in chamber 17 is somewhat similar to that of the fuel receiving surface in the fuel preparation means. During the compression cycle it heats the liquid fuel deposited thereon and holds it in an exposed position where it can be acted on by air to promote pre-flame reactions. The temperature of the surface 33 is maintained by the cooling water at a substantially uniform level at all engine speeds and loads, and, as in the fuel charge preparation means, it heats the fuel to a uniform temperature near to but below the boiling or thermal distillation temperature of at least the major portion of the fuel. Since most fuels contain fractions having substantially different boiling points, the more volatile ends are frequently vaporized, but the major portion of the fuel is always held in the liquid state on the fuel receiving surface.

During the combustion cycle when the gas temperatures above the fuel are very high, the fuel receiving surface also maintains the liquid fuel at a uniform temperature, but functions as a heat sink or cooling means instead of as a heat source. Because of this, the temperature of every incremental portion of liquid fuel, up to the instant of its vaporization and combustion, is maintained substantially the same throughout the cycle. Thus, the last fuel to burn passes through the same temperature cycle as the first fuel to burn, and a positive control of the combustion is attained.

In order to minimize pre-vaporization of the fuel on surface 33 during the compression cycle, the air velocity over the fuel is kept at a low level by means of the described system of converging air flows. In addition to this, a localized circulation is established above the fuel body which collects any fuel vapors that are accidentally formed and holds them in a position directly above the liquid fuel to further minimize vaporization.

The localized circulation is obtained by directing stream 41, by means of the notch or channel 98 in leg segment 20, to flow centrally into the combustion chamber 17 at a level somewhat above the retained liquid fuel and to intercept the centrally rising air stream 75, which unavoidably carries some fuel vapors away from the fuel body. The flow 75 is turned back toward the bottom 70 of chamber 17 as shown by line 99 in Fig. 5, and the fuel is all concentrated on and near the center 69 of said wall 70. The axial flow line 75 about which the fuel vapors circulate is essentially a single ended axis of rotation located above the fuel body, and it intercepts a wall at only one end.

The fuel is not only localized during the compression cycle, but also during the combustion cycle. In order to minimize fuel dispersion during combustion, the fuel receiving surface is made concave in form in the bottom of the combustion chamber and the fuel is deposited thereon. When the ignition flame flows against the fuel it displaces the fuel along the concave surface and tends to hold the fuel against the surface until it is vaporized. This action prevents dispersion of the liquid fuel into the air in the form of atomized droplets, and prevents delayed after-burning and gum formation. The fuel-air mixture, as it is formed and burned, never contains either atomized fuel or prevaporized and overheated fuel vapors.

It is an important feature of the engine design that the ignition and combustion chamber zones most remote from the engine cylinder are charged with excess air. In the ignition chamber the excess air joins with the ignition flame, and, aside from its other functions, acts on the liquid fuel on fuel receiving surface 33 to promote its combustion. This heated air, directly in the vaporizing flame, causes a combustion at the fuel surface the instant the liquid fuel is vaporized. The delay between vaporization and combustion of the vaporized fuel is reduced to a minimum, and this is most effective in preventing detonation.

Similarly, when the flaming gases in the combustion chamber flow in a stream 77 toward the cylinder 10, the excess air which was localized in the upper zone 67 during the compression stroke becomes mixed with the flaming gases and acts to burn the fuel remaining on the fuel receiving surface. In both cases the fuel is held on the surface while the heated air is swept over it. This produces a localized burning at the fuel surface which is always complete regardless of the quantity of excess air present. The fuel does not become dispersed prior to combustion because it is held in a concentrated body until the conditions for combustion are correct. Because of this action it is possible to burn small charges properly in the presence of excess air even at low compression ratios, and a satisfactory part load operation can be attained.

The fuel body is held in a position between the most remote end of the combustion chamber and the engine cylinder, at a point where air sweeps over it in flowing toward the cylinder on the power cycle. Consequently no fuel vaporization can take place in insufficient air, because the last gases leaving the combustion chamber during the power cycle are capable of supporting combustion and clean out the entire combustion system on each cycle. This not only maintains the system in a stable condition, but gives a clean and odorless exhaust from which the characteristic fuel odor of conventional fuel oil burning engines is entirely absent.

The combustion is of the constant volume type at light loads, and a combination of constant volume and constant pressure at full loads. The ignition flame induces the constant volume combustion, while the second sweep of flame from the combustion chamber to the cylinder induces the constant pressure combustion. This is the optimum type of burning for maximum efficiency and smoothness of operation, especially when operating in the desirable ratios of compression around 10 to 1.

When it is cold, the engine is started with volatile fuel such as gasoline. A carburetor, or equivalent means (not shown), is employed to supply the fuel, since the engine will operate as a conventional gasoline engine with throttled air control when the normal injected fuel supply is cut off. It is usually necessary only to bring the engine up to its normal operating speed on the starting system, after which the carburetted charge is cut off and direct fuel injection with full air is begun. If volatile fuel, or a wide cut type including volatile fractions, is being injected, or in any event if the engine is warm, starting is accomplished by simply injecting fuel in the normal manner while cranking.

Figures 9 and 10 show a modified embodiment of the engine also capable of carrying out the combustion process of the invention. This design differs from the preferred form in the connecting zone means used for charging the ignition chamber and combustion chamber during the compression stroke and in the design of the vaporization means, ignition chamber, air cell, and the general arrangement of parts.

This engine is also shown as a four-cycle, water-cooled, valve-in-head type. A cylinder 100 with reciprocating piston 101 therein has its upper end closed with a cylinder head 102, and water jackets 103 enclose said cylinder and cylinder head. Intake valve 104, working in intake port 105 and exhaust valve 106 working in exhaust port 107 are operated in the conventional manner by mechanism not shown. Formed in the head 102 and enclosed by the jacket 103 is a substantially cylindrical combustion chamber 108. It is joined tangentially at a point adjacent its bottom wall 111 by a passage 109 lying in a plane normal to the axis 110 of said chamber. The other end of said passage joins the clearance space 112 above the piston 101.

A spiral ramp 113 whose helix is concentric with axis 110 is formed on the side wall 114 of chamber 108 and surrounds the central bottom wall 111. The ramp begins on the bottom wall 111 at a point near passage 109 and spirals upward in a half turn to blend into overhanging wall 115. Said overhanging wall lies in a plane substantially parallel to the bottom wall 111 and extends into chamber 108 to overhang that portion of said bottom wall directly adjoining passage 109. This forms a communicating zone lying between the combustion chamber and the passage 109.

An ignition chamber 116, located adjacent the combustion chamber 108, has a spark plug 117 at its upper end. A globular bowl or intermediate chamber 118, placed between ignition chamber 116 and chamber 108, is joined tangentially, near its top, by a passage 119 which opens directly into cylinder 100. This passage is tapered, to diffuse air flowing from said cylinder to the bowl 118. An annulus 120, formed around the lower side walls of the ignition chamber, is joined tangentially by passage 121. The other end of passage 121 joins the bowl 118 tangentially near its bottom in a plane passing vertically through the center of the bowl. A second passage 122 also joins said bowl tangentially near its bottom but in a plane normal to the plane of passage 121. Said passage 122 is parallel to passage 109 and joins chamber 108 adjacent the central bottom wall 111 and below the level of ramp 113.

Globular bowl 118 and its associated passages 119, 121 and 122 comprise a structure which functions like the connecting zone of the preferred form. Its distinguishing feature is that it is charged with air through a passage separate from the combustion chamber charging passage, instead of by air from a flow dividing means in a single passage as described in the preferred embodiment.

An air cell or air receiving chamber 123, located adjacent the ignition chamber 116, is joined thereto by a small passage 124 whose length axis is substantially normal to the side of the ignition chamber. A second passage 125 is joined to the diffuser passage 119 and opens tangentially into the side wall of the ignition chamber 116, forming a short groove or open channel 126 therein. The groove joins the passage 124 substantially normally in a plane parallel to the plane of the annulus 120.

An injector 127 has a nozzle 128 which projects into the globular bowl 118. The nozzle has a single large orifice through which a fuel pump (not shown) injects fuel into said bowl in an unatomized stream 129. The fuel impinges obliquely on the bottom wall of said bowl at a point 130 and spreads out into an elongated body extending from point 130 into chamber 108. The full load fuel outline is indicated generally by outline 131 and the small idle charge by outline 132 in the bowl 118.

The engine operates on the same basic cycle as the preferred embodiment. Fuel is injected into the engine preferably just after the beginning of the intake stroke, although injection may extend somewhat into the compression stroke. During the compression cycle, air is displaced into the combustion chamber 108 in a stream 133 which flows up the ramp 113, over passage 122, and above overhanging wall 115. It continues to flow in a circular path around and out of contact with the fuel body on bottom wall 111, which minimizes prevaporization. At the same time, air is displaced into the bowl 118 in a stream 134 which is diffused in passage 119 before it enters the top of the bowl tangentially. The stream flows spirally downward into the bowl and divides into stream 135, which sweeps over the fuel body 132 in the bowl and passes into the ignition chamber, and into stream 136 which passes into the combustion chamber.

Stream 134 is diffused in order to form a barrier in passage 122 with the branch stream 136. This resists the entry of residual gases into the bowl 118 and the ignition chamber 116 from chamber 108. The diffused air also provides a low resistance path for the ignition flame after ignition. Passage 122 opens into chamber 108 below the ramp 113 near the center of said chamber where the force tending to drive the rotating gases into bowl 118 from chamber 108 is a minimum. Side wall 142 is curved to make passage 122 divergent to further minimize the interception of rotating gases.

The air cell charging stream 137 flows through passage 125 and along the groove 126 and is crowded into air cell 123 by ignition chamber charging stream 135. The two streams flow in the same direction and do not readily intermix, so that air enters the air cell while the fuel-air mixture of stream 135 fills the ignition chamber.

After ignition of the fuel-air mixture in the ignition chamber by spark plug 117, the flaming gases pass in a line 138 through the bowl and into the combustion chamber to initiate combustion therein. The flame induced reaction proceeds in a progressive manner as in the preferred embodiment. The burning gases in chamber 108 flow in a line 139 into the clearance space 112 and are deflected by overhanging wall 115 to flow forcefully over any fuel remaining in fuel body 131. This induces a final combustion which completes the reaction.

In passing through the bowl, the ignition flame sweeps forcefully over the bottom wall and any fuel remaining thereon after the compression cycle is spread laterally up the side walls of the bowl as shown by outline 141. Air in the bowl itself plus air from air cell 123 enables the ignition flame to burn a substantial portion of the retained fuel, but, as in the preferred form, some fuel remains on the cooled surface after the passage of the flame and is vaporized on the subsequent cycle. This provides readily ignitable fuel vapors for the ignition chamber.

When the engine is cold and a considerable quantity of fuel remains unvaporized at the end of the compression cycle, the ignition flame heats and spreads the fuel widely over the side walls of the bowl, so that the vaporizing stream 135 readily vaporizes the fuel on the subsequent cycle. This makes the vaporizing action substantially independent of engine temperature.

Air from the air cell 123 flows into the ignition chamber in a stream 140 during the time when pressure is falling in the ignition chamber after peak combustion pressures have been reached. Passage 124 is displaced from the opening of passage 125 by the length of groove 126 in order to minimize loss of air down said passage 125 during the discharge period. The excess air added to the final combustion in the ignition chamber produces a "lean" flame therein which maintains the spark plug and ignition chamber in a clean condition.

Air fills the top of the bowl at the time of ignition and when the ignition flame passes through in a looped flow as shown, this air is partially displaced with the flame into the combustion chamber to produce thereby an ignition flame containing excess air. The remaining air supports combustion in the bowl, and with excess air from air cell 123, maintains the bowl and connecting passages in a clean condition at all times.

Figures 11 and 12 show another embodiment of the invention. This engine has separate fuel injectors for supplying the fixed ignition charge and the variable power charge, and it has a special type of ignition chamber which operates on self-ignition at low pressures with means different from those shown in the preferred embodiment.

The engine is a conventional four cycle, water cooled, valve-in-head type in which the intake and exhaust valves are operated in the usual manner. The cylinder 150 is provided with a clearance space 151 above the piston 152, and the combustion chamber 153, located adjacent the cylinder, is joined thereto by passage 154. An overhanging wall or baffle 156, parallel to bottom wall 155, projects from the side wall of chamber 153 at a level just above the opening of passage 154, and overhangs a portion of the bottom wall 155 at the point where passage 154 opens tangentially into the combustion chamber.

An ignition chamber 157, located adjacent the combustion chamber at a level above the passage 154, is joined thereto by an inclined passage 158. The upper end of said passage blends into the spiral bottom end wall 159 of the ignition chamber, and the lower end opens into the combustion chamber just under the baffle 156. The passage is oriented so that an axial projection will lie on the center of the bottom wall 155.

The ignition chamber has a spark plug 160 screwed on top and an air cell 161 joined to one side by a short inclined passage 162. A fuel injector 163 projects into said ignition chamber and a second injector 164 projects into the combustion chamber 153. The entire cylinder 150, combustion chamber 153, and connecting passage 154 are enclosed by water jacket 165. One-half of the ignition chamber 157 and one-half of the inclined passage 158 are enclosed by the water jacket, while the remainder of the passage and ignition chamber are cooled only by radiation. The uncooled half of the ignition chamber includes the air cell 161.

The cycle of operation is basically equivalent to that of the preferred embodiment, but differs in detail. Prior to the compression stroke a fuel pump (not shown) and injector 163 deliver liquid fuel in a stream 166 onto the upper water cooled end 185 of the spiral end wall 159. The fuel flows both by the force of injection and of gravity toward the lower uncooled end 186 of said wall as shown by the outline 167. The fixed quantity of fuel injected is sufficient to form a near stoichiometric fuel-air mixture in the ignition chamber when the fuel is vaporized. At or about the same time the second injector 164 and a fuel pump (not shown) direct an unatomized stream of fuel 168 onto the center of bottom wall 155 and form a fuel body whose outline is indicated generally by the line 169. This fuel charge is variable in quantity and controls the power of the engine.

During the compression stroke, air from cylinder 150 flows up the passage 154 in a line 170 and circulates horizontally around chamber 153. A portion of the air flows under the baffle 156 in a branch stream 171, while the remainder flows above in a stream 172. Stream 171 circulates around the fuel body 169 and the fuel remains substantially in the liquid state during the compression stroke. The cross section of the lower open end of passage 158 is preferably made, as shown, with a sharp leading edge 173 and some of stream 170 is diverted thereby into branch stream 174 which enters ignition chamber 157 at a low velocity.

The fuel in the ignition chamber is vaporized principally by residual heat in the uncooled portion of the spiral end wall and not by a high velocity air stream as in the preferred embodiment. The fuel injected through injector 163 flows from the upper cooled end 185 toward the lower uncooled end 186 of the spiral end wall 159, and flows over a surface which becomes increasingly hotter. As the fuel flows down this temperature gradient vaporizer, it becomes increasingly hotter and a point is soon reached where self ignition temperatures are attained. As engine loads and temperatures vary, the self-ignition point moves up and down along the surface, providing a dependable ignition source over widely varying operating conditions.

When ignition occurs, the ignition flame flows in a stream 177 down the passage 158 and on through the recessed outer portion 176 thereof into the combustion chamber. In entering said chamber it flows above the high velocity stream 170 so that it is not dispersed thereby, and impinges on the fuel body 169 in the zone of localized circulation in the center of bottom wall 155.

Combustion takes place in the manner already described. After the initial flame induced combustion, gases leaving the chamber 153 are deflected downwardly by baffle 156 to flow forcefully over the fuel on the bottom wall, and the remaining fuel is vaporized and burned.

During the compression cycle air stream 175 branches off of charging stream 174, before said stream reaches the fuel body in the ignition chamber, and charges air cell 161 with air. When the combustion pressure begins to fall, this air flows upwardly from the air cell 161 through passage 162 and enters the ignition chamber in a line 179. The air mixes with the final flame to produce a combustion with diminishing fuel-air ratio and maintains the chamber relatively clean and free of carbon.

To bring the engine to an operating temperature it is preferably started and warmed up slightly by operating momentarily on the Otto cycle with gasoline carburetor and spark ignition. The spark plug 160 is provided for obtaining the initial ignition, but it is not required thereafter. Other conventional methods of starting low compression, self-ignition engines may however also be employed if desired, such as heating the vaporizer by external means before starting, or equivalent methods.

Another type of engine is shown in Figures 14 and 15 which also illustrates the broad scope of the invention. This is an engine in which a separate combustion chamber is designed like the ignition chamber of the preferred embodiment, and operates on a combustion cycle which is essentially equivalent to that employed in said ignition chamber. In order to maintain a uniform fuel-air ratio in the chamber over the load range, the air is throttled at part load as in a conventional gasoline engine, but as will be described, some excess is also provided.

The engine as shown is a conventional four cycle, water cooled type. A cylinder 220 has a piston 221 therein, and a cylinder head 222 closes the upper end of said cylinder to form a combustion space 223 between said head and piston. This combustion space will be defined as the combustion chamber. Formed within said head is a cavity 224 which is separate from the engine cylinder, and this will be defined as the ignition chamber. An annular groove 225 is provided at the lower end of the ignition chamber and a passage 226 joins this groove tangentially and connects said ignition chamber with combustion chamber 223 in cylinder 220. The bottom wall 227 of the ignition chamber is formed as a spiral ramp, and the lowest point thereof blends into the lower wall of passage 226 at the point 228 and the highest point lies just above the upper wall of said passage 226 at the point 229. A fuel injector 230 projects into said annular groove at a point 231 just beyond where passage 226 joins said groove.

A second annular groove 232 surrounds the ignition chamber at its upper end and a spark plug 233 is screwed into said chamber at a point substantially concentric with said groove. An auxiliary air passage 234 opens into the passage 226 at a point 235 where passage 226 turns to join annular groove 225. The other end of passage 234 joins upper annular groove 232 tangentially at a point 236, and the passage is oriented so as to cause air entering groove 232 from passage 234 to flow in the same direction of rotation in said annulus as air entering the lower annulus 225 from cylinder 220 via passage 226.

The engine operates in the following manner. A quantity of liquid fuel is injected into the periphery of the annular groove 225 by means of injector 230 preferably during the intake stroke, but the fuel may be put in later, during the compression stroke, if desired. It is injected in a liquid stream 240 and is deposited in a body 241 on the wall of groove 225 as shown. During the intake stroke, air throttle 237 in intake passage 238 limits the air drawn into the cylinder past intake valve 239 to an amount insufficient to produce a near stoichiometric fuel-air proportion with the injected fuel.

During the compression cycle the air in cylinder 220 is displaced in a stream 242 through passage 226 and enters annular groove 225 to circulate therein and sweep over the fuel body 241. The circulating air in groove 225 sweeps the liquid fuel along in the periphery of the groove, and the spiral ramp 227 directs the fuel stream over and above entering air stream 242 so that the liquid fuel is not aspirated into the entering air stream to form an atomized fuel charge, but remains firmly in contact with the wall of the annular groove until it is vaporized. The air and fuel vapor mixture formed in the groove 225 flows spirally upward along the side walls 244 of chamber 224 in a path generally indicated by flow line 245. This flow continues in a converging spiral 246 toward and past the spark plug points 247, then turns downwardly in an axial flow 248.

During the compression cycle some of the air in stream 242 branches off in a stream 243 and flows through auxiliary passage 234 and into upper annular groove 232, where is circulates, as shown, in the same direction of flow as the circulating fuel and air mixture 245. This minimizes intermixture of the air and the fuel mixture, and the groove 232 becomes substantially filled with air at the time ignition occurs.

The combustion process is substantially equivalent to that described in the ignition chamber of the preferred embodiment. The central core of fuel and air mixture, which is in substantially stoichiometric proportion, is ignited by spark plug 233 and burns, while surrounded by the excess air in groove 232. The combustion heats the excess air, and during the turbulent outflow 249 of the burning gases into combustion chamber 223, the air mixes with said gases to produce a lean, clean burning combustion.

If very volatile fuel is injected it may completely vaporize during the compression cycle, in which case the last air to enter annulus 225 and chamber 224 will contain very little fuel and will surround the central fuel charge with excess air. In this event, the upper annular groove 232 and its air supply are not necessary. The groove is, however, a more certain source of excess air and makes operation possible with wider cut fuels. If any fuel remains unvaporized at the end of the compression stroke, the excess air in stream 249 sweeps over it during the power cycle and burns it directly in groove 225, or the fuel may be carried into the combustion chamber 223 for combustion in the air therein. This final burning takes place in a manner substantially equivalent to the burning of liquid fuel in the combustion chamber of the preferred form of engine.

The combustion systems described, with the exception of the last one which operates on the Otto cycle, are designed to operate on a wide variety of fuels, from volatile gasolines, through the intermediate distillates and wide cut JP types, to heavy diesel fuels. An engine employing these systems is capable of operation over the entire compression range, and at any compression selected, operates on a full excess air cycle at all loads and obtains the excellent part load efficiency characteristic of this type of engine. The clean, gum-free, odorless and knock-free combustion is obtained at all compression ratios.

Adequate pre-combustion preparation plus progressive charge formation and ignition, and positive fuel temperature control during combustion, are three factors which contribute decisively in producing a combustion which is distinctly different from conventional practice. The critical life cycle of every particle of fuel during its burning period is substantially the same, whether it is the first or last fuel to burn. Nowhere in the entire cycle is a condition obtained in which the fuel is prepared for detonation in a manner equivalent to that of the fuel in the end gas charge in a gasoline engine, or the fuel in the charge formed in a diesel engine during the ignition delay period. Nor is there any atomized liquid fuel in the combustion flame, particularly during the late stages of combustion, to detonate or become distilled and polymerized into gum and carbonaceous deposits and formed into evil smelling by-products. It is significant that the combustion obtained by the described process is not only clean during normal operation, but also during periods of deceleration, acceleration and prolonged idling. The unthrottled air charge, no fuel additives, and uniform combustion in the ignition chamber under favorable conditions at all engine loads makes possible an odorless exhaust which is always free of smoke from oil, fuel or fuel-additives. Those engine exhaust by-products which in conventional engines contribute so much to air pollution are entirely absent.

The present application is a continuation-in-part and is connected by copendency with our prior but now abandoned patent applications as follows:

Serial No. 115,544, filed December 12, 1936, entitled Method of Effecting Non-detonating Combustion in an Internal Combustion Engine and Means for same;

Serial No. 305,390, filed November 20, 1939, entitled Internal Combustion Engine and Combustion Method;

Serial No. 448,042, filed June 22, 1942, entitled Combustion Chamber;

Serial No. 448,043, filed June 22, 1942, entitled Internal Combustion Engine;

Serial No. 448,044, filed June 22, 1942, entitled Ignition Means;

Serial No. 517,452, filed January 7, 1944, entitled Combustion Chamber;

Serial No. 549,026, filed August 11, 1944, entitled Combustion Chamber;

Serial No. 715,672, filed December 12, 1946, entitled Oil Combustion Process and Engine;

Serial No. 93,376, filed May 14, 1949, entitled Excess Air Cycle Internal Combustion Engine and Combustion Process;

Serial No. 290,131, filed May 27, 1952, entitled Excess Air Cycle Internal Combustion Process; and Serial No. 290,132, filed May 27, 1952, entitled Excess Air Cycle Internal Combustion Engine.

Reference is also directed to our companion application, filed January 16, 1956, Serial No. 559,152, entitled "Combustion Engine Process," allowed January 16, 1957.

It is understood that the invention is not limited to the precise structure shown and described, but also includes such modifications as may be embraced within the scope of the appended claims.

We claim:

1. In an internal combustion engine of the type having a piston and cylinder, the combination of: a combustion chamber separate from the engine cylinder; a passage connecting the cylinder to the combustion chamber, said passage arranged to direct air entering the combustion chamber from said cylinder to circulate about an axis of rotation intercepting a wall of said combustion chamber at least at one point; an ignition chamber; a passage connecting the ignition chamber to the combustion chamber, said passage arranged to direct gases entering the combustion chamber from said ignition chamber to flow over and against said wall at least in close proximity to said point of interception of said axis of rotation with sad wall; and means for supplying liquid fuel to said wall surface in a region in close proximity to said point of interception of said wall surface by said axis.

2. In an internal combustion engine of the type having a cylinder and piston, the combination of: a combustion chamber separate from said cylinder; a communicating zone joining said combustion chamber; a passage joining said cylinder and said communicating zone, and arranged to direct air flowing from said cylinder into said combustion chamber via said zone in a stream which passes through only a portion of said zone; and means for delivering liquid fuel to at least a portion of that part of said zone not swept by said air stream entering said combustion chamber via said zone but swept by gases flowing from said combustion chamber to said cylinder via said zone.

3. In an internal combustion engine having a piston and cylinder, the combination of: a combustion chamber separate from said cylinder, said chamber being substantially a figure of revolution with a baffle projecting from a side wall thereof in a plane substantially normal to the axis of revolution and spaced from an end wall of said chamber; a passage joining said cylinder, and joining said combustion chamber at a point between said baffle and said end wall; and an ignition chamber in communication with said combustion chamber.

4. In an internal combustion engine of the type having a cylinder and piston, the combination of: a combustion chamber separate from the engine cylinder; an ignition chamber; and a T-shaped passage having a leg and two arms which form a connecting zone, of which the leg joins the engine cylinder, one arm joins the combustion chamber, and the other arm joins the ignition chamber.

5. In an internal combustion engine of the type having a cylinder and piston, the combination of: a combustion chamber separate from said cylinder; an ignition chamber; a first passage joining said cylinder and communicating with said combustion chamber; a second passage joining the ignition chamber; and a T-shaped connecting zone in which the first passage joins, at least in part, the leg of the T, the second passage joins one arm of said T and the other arm of the T communicates with said combustion chamber.

6. In an internal combustion engine of the type having a cylinder and piston, the combination of: a combustion chamber separate from the engine cylinder; an ignition chamber; a small passage joining said ignition chamber; and a T-shaped passage having a leg and two arms, which form a connecting zone, of which the leg joins the engine cylinder, one arm joins the combustion chamber and the other arm joins said small passage which latter has a cross-section less than that of said other arm.

7. In an internal combustion engine having a piston and cylinder, the combination of: a combustion chamber separate from the engine cylinder; an ignition chamber; a T-shaped passage having a leg segment and cross arm which forms a connecting zone, of which the leg segment joins the engine cylinder, and the combustion chamber and ignition chamber join opposite ends of said cross arm; and a raised rib segment on the side of said cross arm opposite the leg segment.

8. In an internal combustion engine of the type having a cylinder and piston, the combination of: a combustion chamber separate from the engine cylinder; an ignition chamber; a passage joining the ignition chamber and communicating with said combustion chamber; passage means configured and arranged to divide the air flowing from the cylinder toward the combustion chamber into a first stream flowing substantially wholly into said combustion chamber and a second stream separate of said first stream; and means for directing at least a portion of said second stream into said ignition chamber passage, and any remainder of said second stream into said combustion chamber.

9. In an internal combustion engine of the type having a cylinder and piston, the combination of: a combustion chamber separate from the engine cylinder; an ignition chamber; a passage joining the ignition chamber and communicating with said combustion chamber; air flow dividing means having at least two air conveying elements in communication with said combustion chamber; a passage from said cylinder to said flow dividing means arranged to direct air flowing from said cylinder more forcefully into a first element of said flow dividing means than into a second element; means for directing the air flowing in said second element substantially wholly into said combustion chamber; and means for directing at least a portion of the air flowing in said first element into said ignition chamber passage and any remainder thereof into said combustion chamber.

10. In an internal combustion engine of the type having a piston and cylinder, the combination of: a combustion chamber separate from the engine cylinder; an ignition chamber; a passage joining said ignition chamber and communicating with said combustion chamber; passage means, including air flow dividing means having at least two air conveying elements, arranged to direct air from the cylinder into the combustion chamber in a first stream flowing into said combustion chamber via one conveying element and a second stream flowing via another conveying element at least in part into said ignition chamber; and aspiration means combined with said passage means and responsive to air flow therethrough for drawing air from said other conveying element to diffuse said air stream therein.

11. In an internal combustion engine having a cylinder and piston, the combination of: a combustion chamber separate from the engine cylinder; an ignition chamber in communication with said combustion chamber; passage means from said cylinder to said combustion chamber and said ignition chamber, said passage means having flow dividing means to divide air flowing therethrough from said cylinder into an ignition chamber charging stream and a combustion chamber charging stream; air aspiration means in combination with said passage to diffuse said ignition chamber charging stream before entry of said stream into said ignition chamber; and air diffusion means in said combustion chamber to diffuse said combustion chamber charging stream after entry of said stream into said combustion chamber.

12. In an internal combustion engine of the type having a cylinder and piston the combination of: a combustion chamber separate from the engine cylinder; wall means defining a first passage joining said combustion chamber, said passage having a length axis passing substantially concentric therethrough; wall means defining a second passage joining said cylinder, said passage having a length axis passing substantially concenrtic therethrough, and joining said first passage with the length axes of said first and second passages lying in planes displaced from each other at the juncture of said passages by at least half the nominal diameter of said first passage and with the angle between said axes when projected one upon the other less than 180°, said configuration forming a junction between said passages in which said second passage is substantially tangential to said first passage, the walls of said passages joining in a sharp edge where the wall of said second passage nearest the axis of said first passage first intersects said second passage; and an ignition chamber in communication with said combustion chamber.

13. In an internal combustion engine of the type having a cylinder and piston, the combination of: a combustion chamber separate from the engine cylinder; wall means defining a first passage joining said combustion chamber, said passage having a length axis passing substantially concentric therethrough; wall means defining a second passage joining said cylinder, said passage having a length axis passing substantially concentric therethrough, and joining said first passage with the length axes of said first and second passages lying in planes displaced from each other at the juncture of said passages by at least half the nominal diameter of said first passage and with the angle between said axes when projected one upon the other less than 180°, said configuration forming a junction between said passages in which said second passage is substantially tangential to said first passage; curved wall means forming an extension of the walls of said first passage at the point of juncture with said second passage, said curved walls forming substantially an involute groove or channel passing at least partially around said first passage in open communication therewith on its open inner side; and an ignition chamber in communication with said combustion chamber.

14. In an internal combustion engine of the type having a cylinder and piston, the combination of: a combustion chamber separate from the engine cylinder; a first passage joining said combustion chamber, said passage having a length axis substantially concentric therethrough; a second passage joining said cylinder, said passage having a length axis passing substantially concentric therethrough, and joining said first passage with the length axes of said first and second passages lying in planes displaced from each other at the juncture of said passages by at least half the nominal diameter of said first passage and with the angle between said axis when projected one upon the other less than 180°, said configuration forming a junction between said passages in which said second passage is substantially tangential to said first passage; and an ignition chamber in communication with said combustion chamber.

15. In an internal combustion engine having a cylinder and piston, the combination of: a combustion chamber separate from the engine cylinder; an ignition chamber in communication with said combustion chamber; passage means from said cylinder to said combustion chamber and said ignition chamber, said passage means having flow dividing means to divide air flowing therethrough from said cylinder into an ignition chamber charging stream and a combustion chamber charging stream; air diffusion means in combination with said passage to diffuse said ignition chamber charging stream before entry of said stream into said ignition chamber; and air diffusion means in said combustion chamber to diffuse said combustion chamber charging stream after entry of said stream into said combustion chamber.

16. In an internal combustion engine of the liquid fuel injection type, having a cylinder and piston, the combination of: a combustion chamber separate from the engine cylinder; an ignition chamber; a passage joining said ignition chamber and said combustion chamber, forming a connecting zone therebetween; passage means from said cylinder to said connecting zone; and flow dividing and directing means associated with said passage means which divide air entering said connecting zone from said cylinder into a first stream, a second stream and a third stream, and direct said first stream into said combustion chamber and said second stream at least in part into said ignition chamber; said flow dividing and directing means including air diffusion means which diffuses said third stream of air and directs said diffused srteam into said connecting zone.

17. In an internal combustion engine of the type having a piston and cylinder, the combination of: a combustion chamber separate from said cylinder; an ignition chamber; a passage joining said ignition chamber and said combustion chamber, forming a connecting zone therebetween; passage means from said cylinder to said connecting zone arranged to deliver two streams of air from said cylinder to said zone; air diffusion means in said zone to diffuse said two air streams received from said cylinder; and flow directing means in said zone to direct said diffused air in a plurality of streams toward said combustion chamber and a plurality of streams toward said ignition chamber.

18. In an internal combustion engine of the type having a piston and cylinder, the combination of: a combustion chamber separate from said cylinder; an ignition chamber; a passage joining said ignition chamber and said combustion chamber, forming a connecting zone therebetween; passage means from said cylinder to said connecting zone to convey air from said cylinder to said zone; air diffusion means in said zone to diffuse said air received from said cylinder; and flow division means in said zone to divide and deliver said diffused air simultaneously to said combustion chamber and said ignition chamber.

19. In an internal combustion engine of the liquid fuel injection type having a piston and cylinder, the combination of: a combustion chamber separate from said cylinder; an ignition chamber; a passage joining said ignition chamber and said combustion chamber, forming a connecting zone therebetween; passage means from said cylinder to said connecting zone, to convey air from said cylinder to said connecting zone; air diffusion means in said zone to diffuse a portion of said air and deliver said air to said combustion chamber; liquid fuel receiving means in said zone; air directing means in said zone for forcefully directing an undiffused portion of said air over said fuel receiving means; and air diffusion means in said zone for diffusing another portion of said air and delivering it to said ignition chamber.

20. In an internal combustion engine of the liquid fuel injection type having a cylinder and piston, the combination of: a combustion chamber separate from the engine cylinder; an ignition chamber; a passage joining said ignition chamber and said combustion chamber forming a connecting zone therebetween; fuel vaporization means located in said connecting zone; and passage means from said cylinder to said connecting zone to convey air from said cylinder to said zone and thence in part to said combustion chamber and in part to said ignition chamber via, at least in part, said fuel vaporization means.

21. In an internal combustion engine of the liquid fuel injection type having a cylinder and piston, the combination of: a combustion chamber separate from the engine cylinder; an ignition chamber; a passage joining said ignition chamber and said combustion chamber forming a connecting zone therebetween; passage means from said cylinder to said connecting zone joining said zone at a point between said ignition chamber and said combustion chamber; and fuel vaporization means located in said connecting zone at a point between said ignition chamber and said point of juncture of said passage means and said connecting zone, whereby air entering said ignition chamber from said cylinder flows at least in part through said fuel vaporization means to convey fuel vapors therefrom into said ignition chamber, and conversely, after ignition of the fuel in said ignition chamber, the flaming gases therefrom flow at least in part through said fuel vaporization means to enhance the vaporization of fuel in said means for the subsequent engine cycle.

22. In an internal combustion engine of the liquid fuel injection type, having a piston and cylinder, the combination of: a combustion chamber separate from said cylinder; an ignition chamber, a passage joining said ignition chamber and said combustion chamber, forming a connecting zone therebetween; passage means from said cylinder to said connecting zone; a fuel receiving surface in said zone; means for supplying liquid fuel to said surface; and a pocket forming a fuel vapor collection zone in said connecting zone located between said ignition chamber and the point of juncture of the passage from said cylinder.

23. In an internal combustion engine of the liquid fuel injection type having a piston and cylinder, the combination of: a separate combustion chamber, communicating with said cylinder, having an end wall concave in form; fuel injection means for depositing liquid fuel on said concave surface; an ignition chamber; and a passage from said ignition chamber joining said combustion chamber at a point adjacent said concave surface such that gases flowing from said ignition chamber into said combustion chamber flow against and across said concave surface and said fuel body thereon.

24. In an internal combustion engine having a piston and cylinder, the combination of: a combustion chamber separate from said cylinder, said chamber being substantially a figure of revolution having an end wall in the form of a spiral ramp with its helix substantially concentric with the axis of revolution; a passage joining said cylinder and joining said combustion chamber tangentially in a plane substantially normal to the axis of revolution and adjacent the end wall; and an ignition chamber in communication with said combustion chamber.

25. In an internal combustion engine having a piston and a cylinder, the combination of: a combustion chamber separate from the engine cylinder; a passage joining said cylinder and said combustion chamber; an ignition chamber; an intermediate chamber; a passage joining said intermediate chamber and said cylinder; a passage joining said intermediate chamber and said ignition chamber; a passage joining said intermediate chamber and said combustion chamber; and means for injecting fuel into said intermediate chamber and said combustion chamber.

26. In an internal combustion engine having a piston and cylinder, the combination of: a combustion chamber separate from said cylinder, said chamber having an end wall comprised of a spiral ramp and a central wall, normal to the axis of the helix of said ramp, spaced below the level of said ramp, and substantially surrounded by said ramp; a passage joining said cylinder and joining said combustion chamber tangentially in a plane substantially normal to the axis of said helix and adjacent said end wall; an ignition chamber; and a passage joining said ignition chamber and joining said combustion chamber at a level below said ramp and adjacent said central wall.

27. In an internal combustion engine having a cylinder and piston, the combination of: a combustion chamber separate from the engine cylinder; an ignition chamber in communication with said combustion chamber; passage means connecting said engine cylinder to said combustion chamber and adapted to convey air from said cylinder to said combustion chamber; passage means connecting said engine cylinder to said ignition chamber and adapted to convey air from said cylinder to said ignition chamber; and air diffusion means associated with said last named passage means for diffusing the air supplied to said ignition chamber to a greater degree than the air supplied to said combustion chamber by said first named passage means.

28. In an internal combustion engine of the fuel injection type having a cylinder and piston, the combination of: a combustion chamber; an ignition chamber; means for producing fuel vapors; a passage in communication with said fuel vapor producing means and said cylinder, and joined tangentially to said ignition chamber so that fuel vapors from said vapor producing means flow in said ignition chamber in a circulating path about an axis of rotation; a second passage in communication with said cylinder and said ignition chamber, terminating in said ignition chamber in an open channel lying in a plane normal to said axis of rotation; and an air receiving chamber in communication with said ignition chamber at a point in said channel, whereby air entering said channel from said cylinder enters said air chamber without intermixture with said fuel vapors.

29. In an internal combustion engine of the type having a cylinder and piston, the combination of: a combustion chamber separate from the engine cylinder and having an end wall; an ignition chamber; a passage joining said ignition chamber to said combustion chamber at a point adjacent to said end wall; and passage means joining said cylinder to said combustion chamber, said passage means including flow directing means arranged to direct a portion of the air entering said combustion chamber to flow about said chamber in a path spaced away from said end wall and passage to the ignition chamber, and including other flow directing means arranged to direct a second portion of the air entering said combustion chamber to flow adjacent said end wall and at least in part into said ignition chamber passage.

30. In an internal combustion engine of the liquid fuel injection type having a cylinder and piston, the combination of: a combustion chamber; an ignition chamber; a passage joining said ignition chamber and said combustion chamber whereby said ignition chamber is charged with air; fuel injection means for supplying liquid fuel to said ignition chamber in a region remote to the juncture of said passage with said ignition chamber; and an air receiving chamber joined to said ignition chamber at a point between the juncture of said air passage and said fuel receiving region.

31. In an internal combustion engine of the liquid fuel injection type having a piston and cylinder and a combustion chamber, the combination of: an ignition chamber, including a fuel receiving wall; cooling means which cool one end of said fuel receiving wall more than the other end; fuel injection means for depositing liquid fuel on the cooler end of said fuel receiving wall and displacing said fuel along said wall toward the least cooled end; and a passage joining said ignition chamber to said combustion chamber.

32. In an internal combustion engine of the liquid fuel injection type having a piston and cylinder, the combination of: a combustion chamber in communication with said cylinder; an ignition chamber; passage means connecting said ignition chamber to said combustion chamber and said cylinder arranged in such manner that gases entering said ignition chamber from said cylinder circulate in said ignition chamber about at least one axis of rotation; and ignition means in said ignition chamber at a point substantially on said axis of rotation.

33. In an internal combustion engine of the liquid fuel injection type, having a piston and cylinder, the combination of: a combustion chamber in communication with said cylinder; an ignition chamber having a channel extending at least partially around said chamber; a passage from said combustion chamber to said ignition chamber, said passage joining said channel tangentially substantially in the plane of the channel, whereby gases entering said channel are directed to flow in a circulating path about an axis of rotation; and ignition means in said ignition chamber at a point substantially on said axis of rotation of said gases.

34. In an internal combustion engine of the liquid fuel injection type, having a piston and cylinder, the combination of: a combustion chamber in communication with said cylinder; an ignition chamber having a channel extending at least partially around said chamber; a passage from said combustion chamber to said ignition chamber, said passage joining said channel tangentially substantially in the plane of said channel, whereby gases entering said channel are directed to flow in a circulating path about an axis; and fuel vaporization means in said passage.

35. In an internal combustion engine having a cylinder and piston, the combination of: a combustion chamber; an ignition chamber substantially in the form of a figure of revolution about an axis, with at least one region having a larger radial dimension than adjoining portions of said chamber; passage means in communication with said cylinder and joined to said ignition chamber at a point such that air entering said ignition chamber from said passage flows in a circulating path in the region of larger radial dimension in a plane substantially normal to said axis of said ignition chamber; means for producing fuel vapors; and a second passage in communication with said fuel vapor producing means and joined to said ignition chamber at a point such that fuel vapors from said means entering said ignition chamber flow in a circulating path about said axis of revolution in the same direction of rotation as said air in said region of larger radial dimension, whereby said air and said fuel vapors do not readily intermix.

36. In an internal combustion engine of the fuel injection type having a cylinder and piston, the combination of: a combustion chamber in communication with said cylinder; an ignition chamber; a passage joining said ignition chamber and communicating with said combustion chamber whereby said ignition chamber is charged with fuel vapors; an air receiving space in communication with said ignition chamber; and a separate passage in communication with said air space and said cylinder, whereby air is supplied to said air space simultaneously with and independently of the charging of said ignition chamber with fuel vapors.

37. In an internal combustion engine of the liquid fuel injection type having a piston and cylinder, the combination of: a combustion chamber in communication with said cylinder; an ignition chamber; passage means connecting said ignition chamber to said combustion chamber and said cylinder; a liquid fuel injector having a length axis and an orifice adapted to deliver liquid fuel in a stream substantially normal to said axis, and with said injector located such that said fuel stream passes down the length axis of said passage in a direction away from said ignition chamber; and means for rotating said injector about its length axis whereby the quantity of fuel deposited in said passage may be varied.

No references cited.